Patented June 1, 1943

2,320,766

UNITED STATES PATENT OFFICE 2,320,766

METHOD OF SEPARATING ALBUMIN FROM NATURALLY AND ARTIFICIALLY PREPARED SOLUTIONS, PARTICULARLY BLOOD

Peter Voskresensky and Maria Sheremet, Moscow, Union of Soviet Socialist Republics No Drawing. Application March 12, 1940, Serial No. 323,632. In Union of Soviet Socialist Republics June 23, 1938

10 Claims. (Cl. 260—122)

At the present time different methods are in use for separating albumin from natural and artificial solutions obtained in any manner. Extensive use is made, for instance, of drying out solutions in spraying towers (treating blood, milk, eggs) or in drying ovens (glue, etc.) and so forth. After these processes, the final product is obtained in the form of a powder or cake.

Other methods comprise coagulating the albumin by applying heat (blood), salting (blood and glue) or by the use of electrolytes (blood and glue).

The albumin obtained by the above methods is, to a considerable extent, denaturated since the drying process is inevitably accompanied by the application of a certain amount of heat, thus leading to deterioration of the product, mainly as regards the percentage of soluble albumins. Furthermore the evaporation of blood requires the use of cumbersome and capricious apparatus, requiring continuous attention and careful control of the process. Naturally, this leads to high overheads on the price of the product.

Albumin produced by this method could not be used extensively in industrial applications, since, on the one hand, the price was prohibitive and, on the other, the quality was not uniform.

It is quite natural that in view of the above, many inventors and scientists have been attempting to find methods of obtaining albumin or its derivatives without the use of evaporation. This resulted in the search for chemical methods, in particular for a chemical reaction that introduced an organic or inorganic group into the albumin molecule.

These albumin derivatives possess other qualities and are much cheaper and as a result have acquired considerable industrial value.

The applicants have established, that under certain conditions, crude oil products, that are soluble in organic solvents or water, particularly sulphonaphthenic acids, can be used to react with solutions of any albumins so as to obtain products of great industrial value and applicable to diverse uses.

For instance if we take blood, either whole, defibrated or separated, and acidify it with any acid, then on the addition of a solution of sulphonaphthenic acid, the albumin in the blood reacts with the acid and an insoluble precipitate of a sulphonaphthenic derivative of albumin is formed.

The precipitate is separated by any of the usual means and washed, afterwards being pressed or centrifuged and dried.

The precipitate can be desiccated without previous washing, the liquid phase being either separated or evaporated. Under certain conditions the quality of the product does not suffer from this process.

The water content of the product can be reduced to 20–30% by the application of pressure, thus hastening the drying process.

The molecular weight of the naphtha by-products is of importance in determining the character of the chemical reaction. The higher the molecular weight, the quicker the precipitate separates out; the lower the molecular weight, the more difficult the precipitate settles down because of its very fine grain.

The acid used to acidify the albumin is of importance as some acids assist in forming salts of the albumin derivative that are soluble in water.

The precipitation of the albumin can be carried out without the addition of acid, but in this case the amount of naphtha by-products required for the process is considerably increased. This, of course is not economical since the cost of the acid used is much less than the cost of the extra amount of naphtha by-products required for depositing the albumins without the assistance of acid.

Furthermore the weight of the constituents of the reaction is much less for the process in which the albumin solution is acidified.

The reaction depends to a considerable extent upon the temperature at which the albumin is precipitated. The process is most effective if the temperature of the solution is kept between 15–20° C. At lower temperatures, the process is slower, while at higher temperatures, the amount of precipitant required is augmented.

The reaction of the medium is of great importance. The nearer the hydrogen ion concentration is to the isoelectric point, the easier the process proceeds. At the same time the albumin content is more completely precipitated and the amount of precipitant required for the process is reduced.

In general the consumption of the precipitant depends upon the type of albumin being precipitated as well as upon the conditions under which the reaction is carried out, in particular, those mentioned above. The use of precipitants to the amount of 50% of the albumin can be considered economical and admissible.

If we take any solution of glutin instead of blood, it is possible, by using the above process to separate several fractions of the derivatives of this albumin. They differ from each other in viscosity and all make excellent glue.

All the albumin derivatives produced by these reactions are soluble in any alkali and under definite conditions, react with organic bases to form new compounds.

Should the albumin being processed be insoluble in water, it is necessary first of all to form a solution of it by some means, after which the desired derivative may be precipitated by the above process. An alkali may be successfully used for forming the solution required for the precipitation process.

The new albumin derivatives obtained by this method from blood is an excellent material for preparing glue for the plywood industry. Furthermore when used either in a pure form or admixed with other substances, they can serve as active fillers in the plastics field or in certain circumstances they can form thermoplastic and thermo-reactive resins.

The advantages of the proposed invention are as follows:

It is economical in particular as regards substitutes for phenol; the artificial resin is from 25 to 30% cheaper than that obtained from pure phenol.

It is possible to obtain products of a quality unobtainable by known methods. For instance the product obtained by the process according to the present application absorbs only an extremely small amount of water—about 0.1% which is much less than that of pure phenol plastics. The excellent dielectrical properties of the product obtained by the proposed method makes it an excellent material for the electrical industry.

Naturally the uses of the products obtained by the method according to the present invention are not limited to those mentioned above. The proposed method can be used for processing any solution of any albumin and gives a product suitable for further processing. Similarly other naphtha (crude oil) by-products apart from those mentioned above, can be used for the purpose of the invention, just as any acid can be used for acidifying the albumin solution.

The same can be said as to the temperature of the solution, as the temperature range of 15-20° C. mentioned above is only the optimum range.

Having particularly described the invention and the manner in which it is to be performed, we herewith state that what we claim is:

1. The method of preparing products, suitable for use in preparing plastics, glues, lacquers and finishes, from natural and artificial albumins, which comprises adding to the aqueous solution of such an albumin a water-soluble, sulfonated organic compound selected from a class consisting of sulfonated naphthas, sulfonated naphthenes and sulfonaphthenic acids, and recovering the resulting precipitate.

2. The process of claim 1 wherein the albumin solution is acidified prior to the addition of the sulfonated organic compound.

3. The process of claim 1 wherein the temperature during the precipitation step is between about 15° and 20° C.

4. The process of claim 1 wherein the albumin solution employed is blood.

5. The process of claim 1 wherein the albumin solution is acidified prior to the addition of the sulfonated organic compound and the temperature at the time of the addition is within the range of about 15° to 20° C.

6. The process which comprises mixing an aqueous solution of blood with a sulfonaphthenic acid and recovering the resulting precipitate.

7. A method of producing albumin derivatives, wherein natural or artificially prepared solutions of albumin are precipitated by adding products of sulphating of methane and naphthene hydrocarbons of naphtha and distillates of naphtha, the product thus obtained being suitable for industrial use (plastics, glues, lacquers and finishes).

8. A product obtained from precipitating albumin derivatives from natural or artificially prepared solutions by adding products of sulphating of methane and naphthene hydrocarbons of naphtha and distillates of naphtha, said product being soluble in alkalies and combining with organic bases of the aliphatic and aromatic series so as to form new products.

9. An albumin composition suitable for use in the preparation of plastics, glues, lacquers and finishes, soluble in water and organic solvents, capable of reacting with organic bases and consisting of the reaction products obtained by reacting an aqueous solution of albumin with a sulfonated organic compound selected from a class consisting of sulfonated naphthas, sulfonated naphthenes and sulfonaphthenic acids, followed by recovery of the resulting precipitate.

10. The process which comprises adding to an aqueous solution of a natural albumin approximately 50 per cent by weight, based on the weight of the albumin, of a sulfonaphthenic acid, the temperature of the aqueous solution being within the range of about 15 to 20° C. and the solution being substantially at its isoelectric point, whereby a plastic precipitate is obtained which is suitable for use in making plastics, glues, lacquers and finishes.

PETER VOSKRESENSKY.
MARIA SHEREMET.